Jan. 19, 1937.  E. B. HUDSON  2,067,923
TENSION ROLLING APPARATUS AND METHOD
Filed April 26, 1933  8 Sheets-Sheet 4
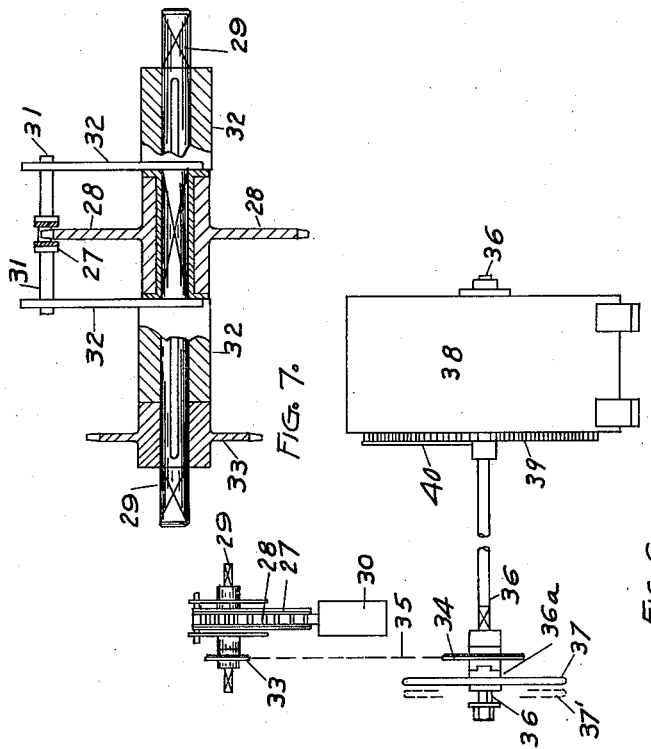
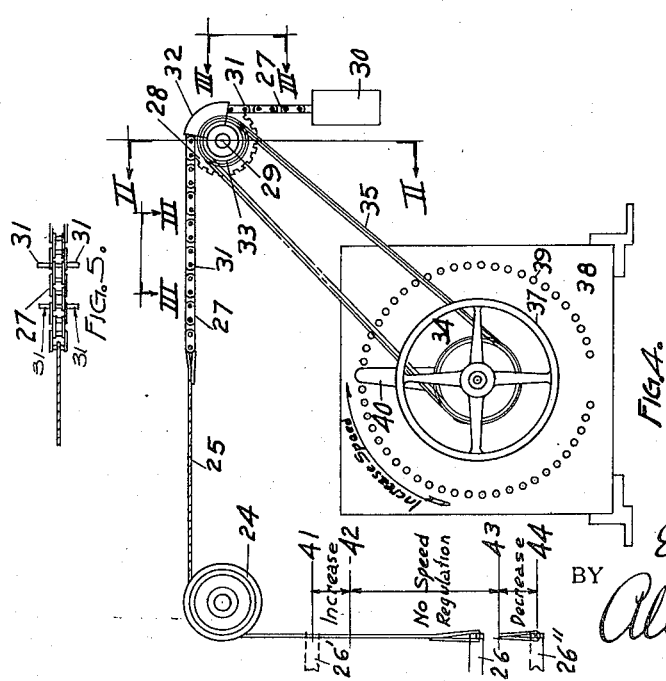
INVENTOR
Edwin B. Hudson
BY
Allen & Allen
ATTORNEYS.

Jan. 19, 1937.  E. B. HUDSON  2,067,923
TENSION ROLLING APPARATUS AND METHOD
Filed April 26, 1933  8 Sheets-Sheet 5
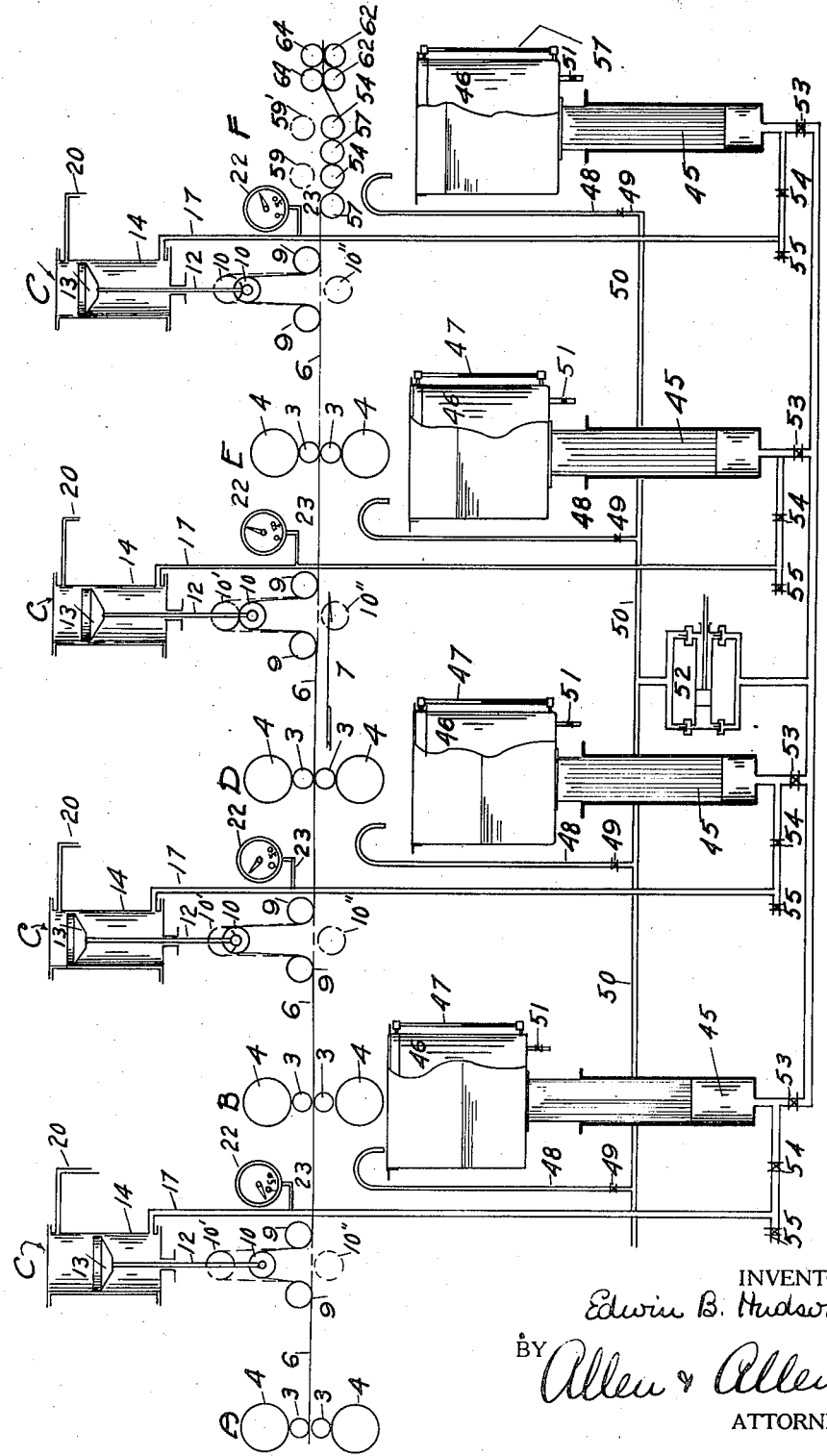

Jan. 19, 1937.  E. B. HUDSON  2,067,923
TENSION ROLLING APPARATUS AND METHOD
Filed April 26, 1933  8 Sheets-Sheet 6
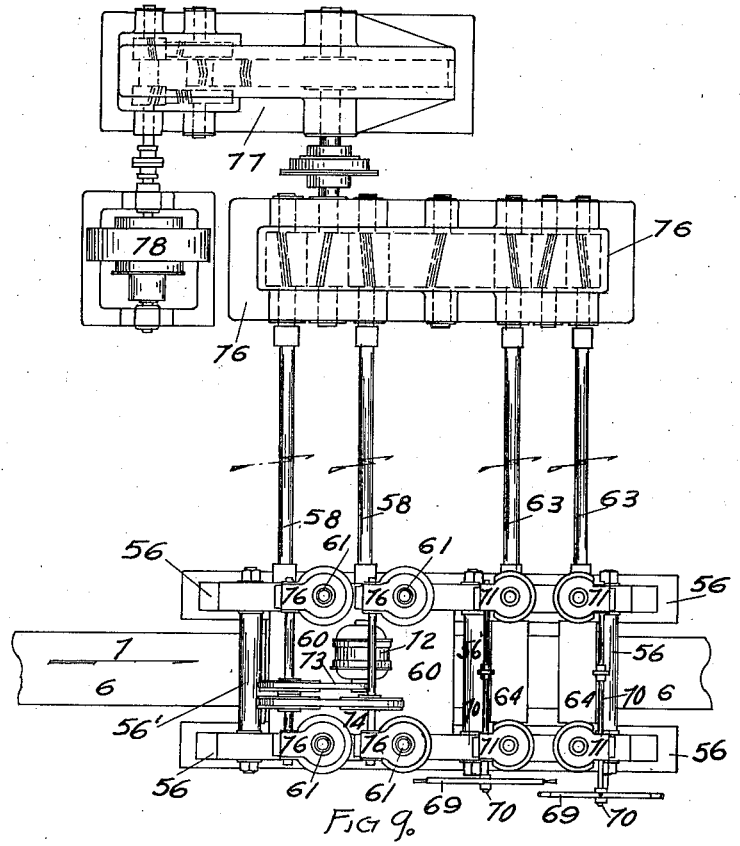
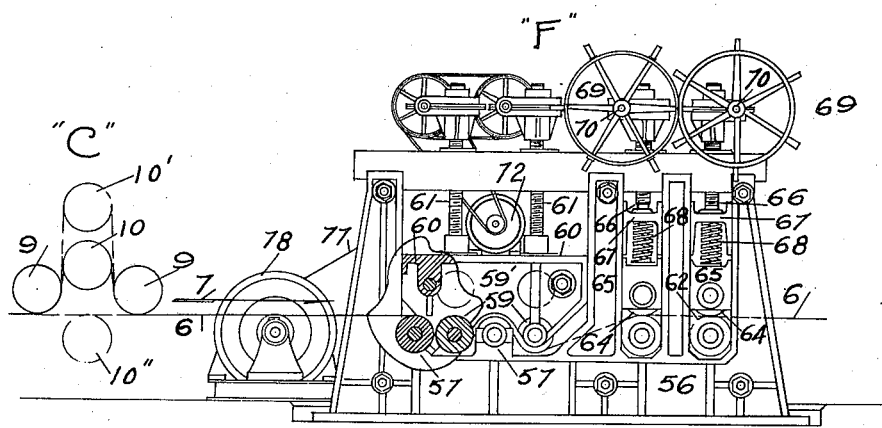
INVENTOR
Edwin B. Hudson
BY Allen & Allen
ATTORNEYS.

Jan. 19, 1937.　　　E. B. HUDSON　　　2,067,923
TENSION ROLLING APPARATUS AND METHOD
Filed April 26, 1933　　　8 Sheets-Sheet 7
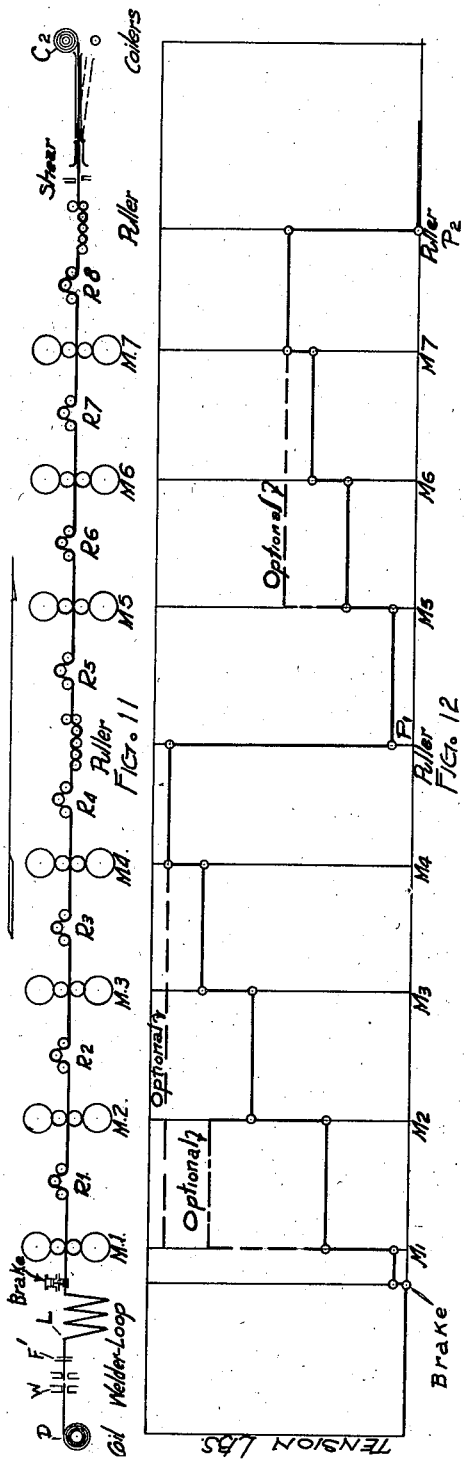
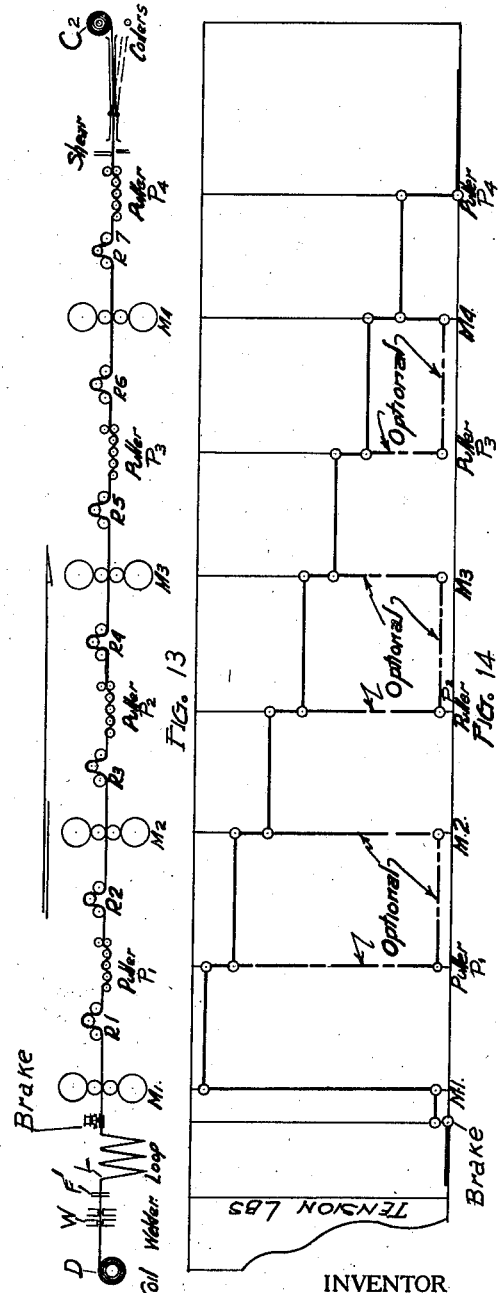
INVENTOR
Edwin B. Hudson
BY
Allen & Allen
ATTORNEYS.

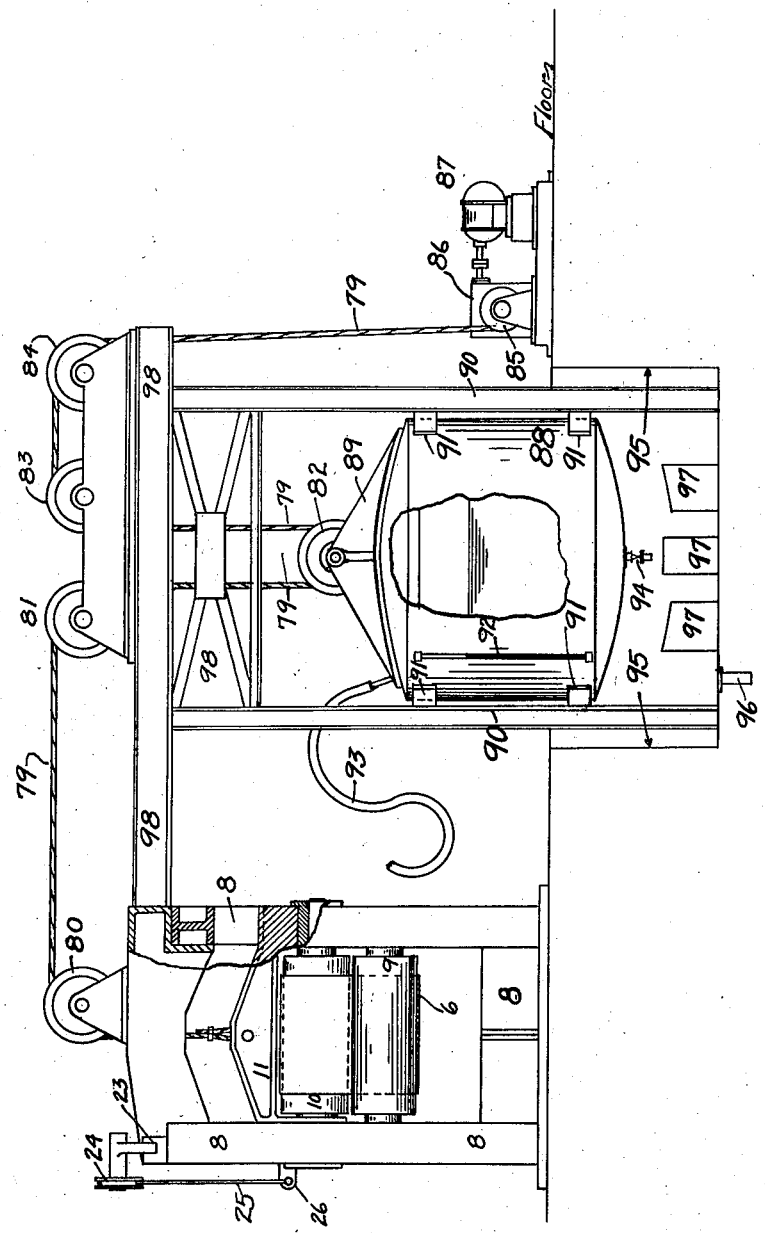

Patented Jan. 19, 1937

2,067,923

UNITED STATES PATENT OFFICE 2,067,923

TENSION ROLLING APPARATUS AND METHOD

Edwin B. Hudson, Middletown, Ohio, assignor to The American Rolling Mill Company, Middletown, Ohio, a corporation of Ohio Application April 26, 1933, Serial No. 668,101

10 Claims. (Cl. 80—35)

My invention relates to an apparatus for the cold rolling of strip metal, which apparatus will produce sheets or strips therefrom of small gauge and in large tonnages, and to the basic method inherent in the rolling of strip by the new apparatus or other apparatus for accomplishing like operations.

My invention relates to the use of a plurality of mills forming what is ordinarily termed a train, and it is the object of my invention to provide for the rolling of strip metal continuously through a plurality of mills, under tension which is constantly maintained with respect to any pass, and which is controlled with respect to all passes so that the system is capable of continuous production and uniform and continuous control. Hence it is an object of my invention to provide a rolling apparatus and method so operating and so controlled that, excepting for an original starting portion, all parts of all strip metal rolled shall be treated alike.

Generally speaking, I provide as a series of cooperating instrumentalities, a welder and a looper for forming a continuous supply of strip metal to be treated, a series of rolling mills, and a pulling machine or machines arranged in tandem, and an ultimate severing device, together with a series of static tension controllers to maintain at the entering and exit sides of each rolling mill of the train a constant, predetermined tension, with the possible, though not the necessary, exception of the first rolling mill in the train. In addition, I provide means for maintaining the speeds of the various mills and pulling devices in such a way as to secure continuous uniform operation, and to maintain a continuous application of the static tension, as will hereinafter be more fully described.

In a copending application of even date Serial No. 668,100, and entitled "Rolling under tension" I have set forth and claimed a specific and special method of control falling within my general method and producing a special result. The particular static tension device illustrated and described herein is the invention of myself and John B. Tytus, as set forth in our application, Ser. No. 670,930, filed May 13, 1933 and entitled "Automatic devices for maintaining and controlling tension."

As exemplary of my invention, I have illustrated a particular arrangement of apparatus, and in charts and diagrams I have set forth several optional modes of control. These items will be fully described and the inventive features inherent will be set forth in the claims which follow, and to which reference is hereby made.

In the drawings:

Figure 4 shows the devices by which the mill motor rheostat of the mill immediately following the speed and tension control equipment is actuated.

Figure 5 shows a portion of the chain controlling the position of the mill motor rheostat (sec. III—III).

Figure 6 is an end elevation of the apparatus of Figure 5.

Figure 7 is an enlarged detail of a part of the apparatus shown in Figures 4 and 6.

Figure 8 shows in diagram an alternate method of actuating the mill speed and tension equipment shown in Figures 1, 2 and 3, utilizing hydraulic accumulators.

Figure 9 is a plan view of our pulling or tensioning device, and the drive therefor.

Figure 10 is a side elevation of the tensioning device.

Figure 11 is a diagrammatic representation of one form of apparatus embodying my invention and comprising a plurality of cold mills forming a train, with pulling devices located between the fourth and fifth mills and beyond the seventh mill, respectively.

Figure 12 is a tension diagram showing several ways of operating the organization of instrumentalities of Fig. 11, including the process of operation specifically set forth and claimed in my copending application of even date, to which reference has been made.

Figure 13 is another diagrammatic representation of an organization of parts falling within the scope of my invention, and characterized in this instance by the location of a pulling device between each of the several mills in the train, and beyond the final mill of the train.

Figure 14 is a tension diagram showing several methods of operation of the organization of instrumentalities of Fig. 13.

Fig. 15 shows a static tension device of a slightly different type, namely one actuated by gravity.

It will be understood that Figs. 11 to 14, inclusive, are exemplary only of devices and processes which may be employed in carrying out my invention.

The particular embodiment chosen by me for the purpose of an exemplary showing herein, is a train of tandem four-high mills for cold rolling metal strip of sheet width to thin gauges, such as tin mill gauges. The four-high mills in this instance are mills with small working rolls which are driven, and large backing up rolls. It will be understood that this embodiment is exemplary only, and is not limiting upon my invention.

Figure 1:
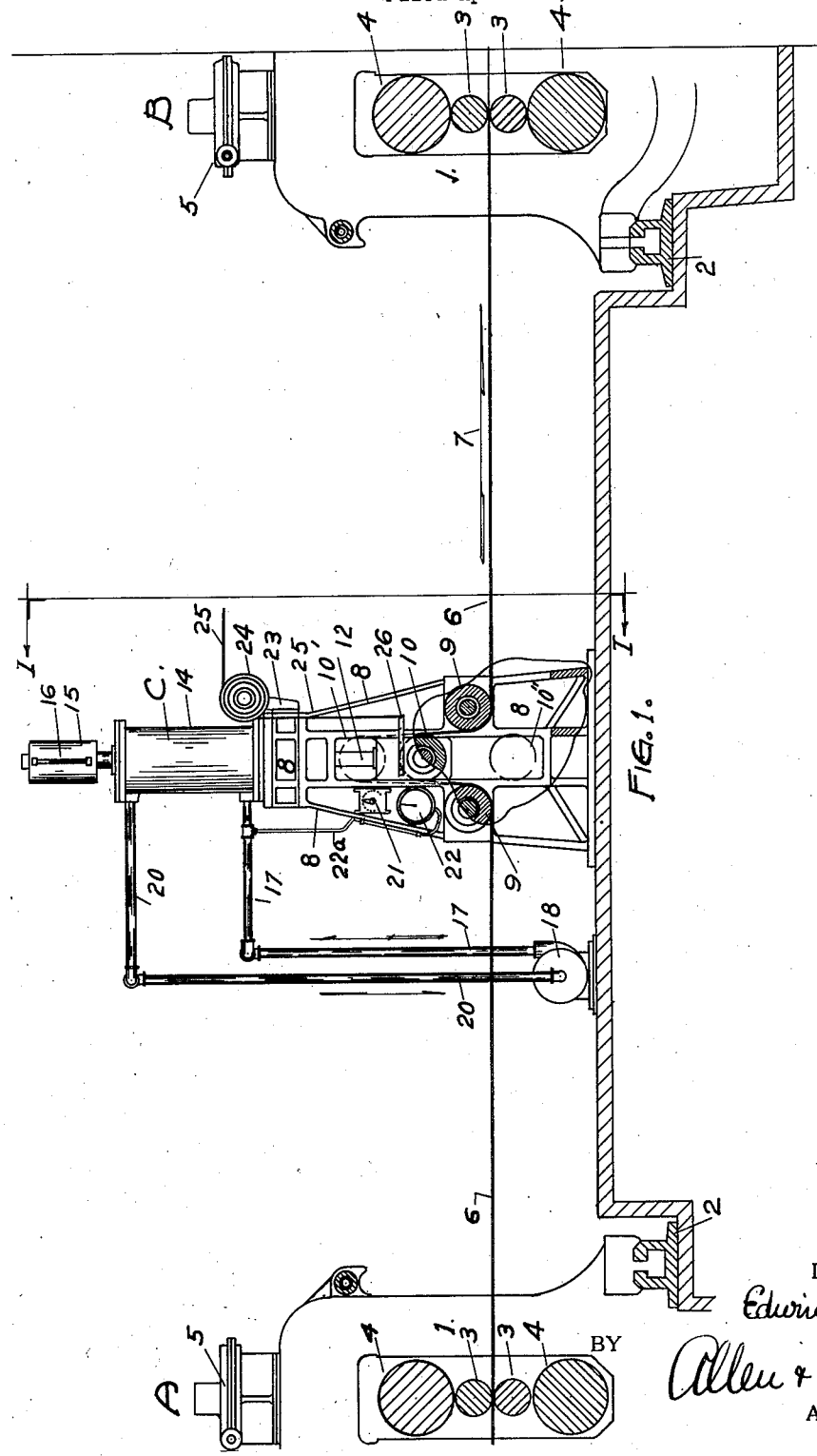
Figure 1 shows an elevation of the mill speed and tension control device located between two mills of a cold mill tandem train.
Figure 2:
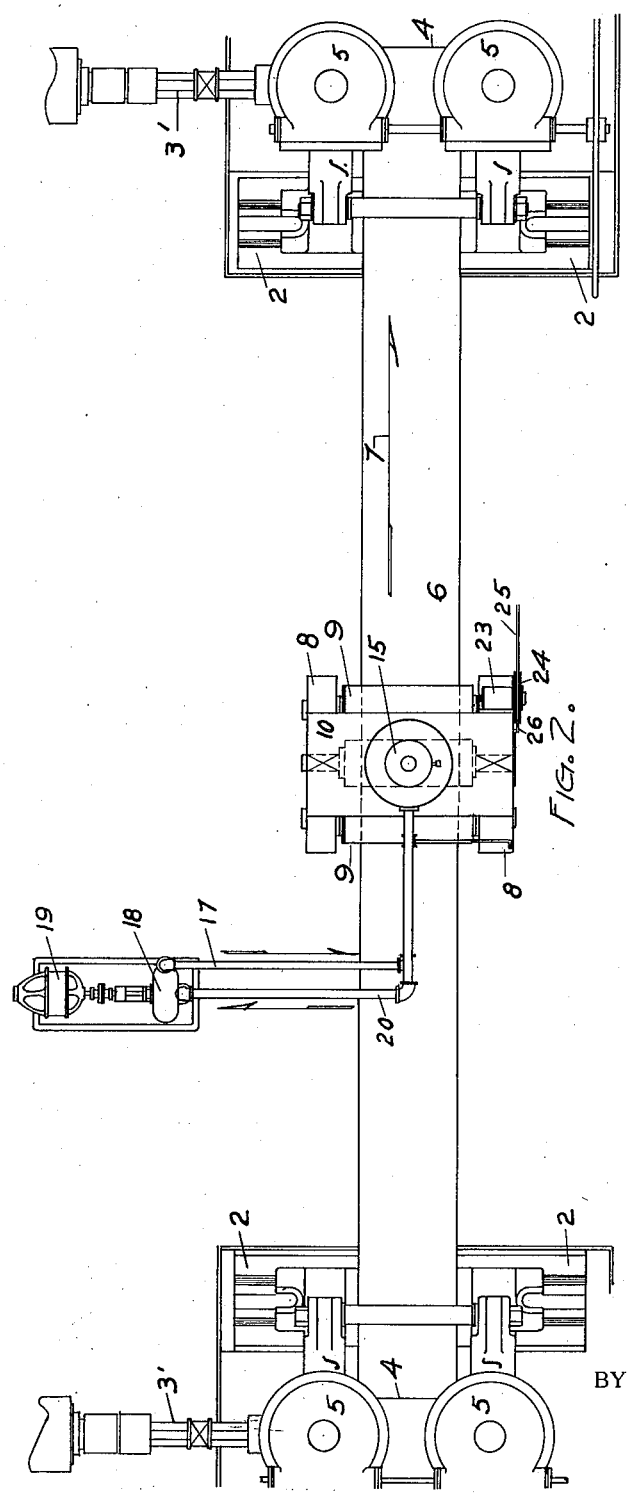
Figure 2 shows a plan of the mill speed and tension control equipment and mills shown in elevation in Figure 1.
Figure 3:
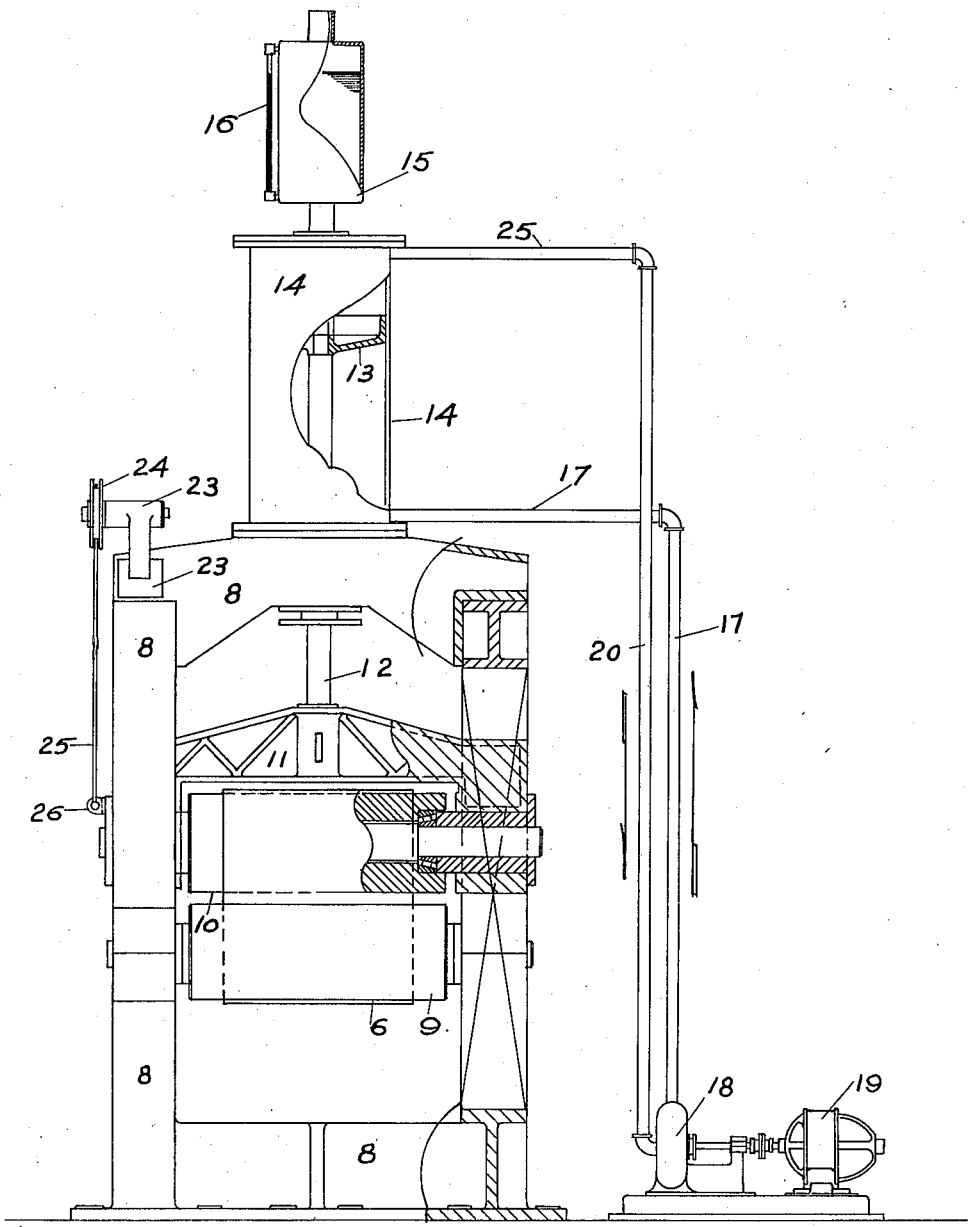
Figure 3 is a front elevation of my preferred mill speed and tension control equipment, with parts in section.

In Figure 1, a four high-mill in a train is indicated generally at A, and the succeeding mill is indicated at B. The mills are identical, and like numbers are employed for like parts. The mill comprises mill housings 1, resting on mill shoes 2, the working rolls 3, which are driven by mill spindles $3^1$, (in Fig. 2), and the back up rolls 4. The mill is provided with suitable screw-down mechanism 5. The rolling piece 6 is passed through the mill A, thence through the mill speed and tension control apparatus indicated generally at C, thence through mill B in the direction of the arrow 7.

The mill speed and tension control C comprises a suitable frame 8 in which two stationary rolls 9 (capable of rotation) are mounted, preferably so that the bottom periphery is at the same elevation as the mill pass between mill rolls 3—3. A movable roll 10 is mounted in a yoke 11 with suitable bearings. The yoke is slidably mounted, as shown, in ways on the frame 8. The roll 10 is thus vertically movable with respect to the frame 8. In several of the figures a high position is indicated at 10', and a low position at 10''. The mills of the train may be initially threaded with the roll in the position 10''.

The yoke 11 is connected to a piston rod 12, bearing a piston 13, operating in a hydraulic cylinder 14 which is mounted on the housing 8. A reservoir tank 15 may be provided to retain an extra supply of oil. A gauge glass 16 can be used to indicate the oil level. I have shown an oil pump 18 driven by a variable speed motor 19. Pipe 17 conveys the high pressure oil from the pump 18 to the lower side of piston 13, and another pipe 20 conveys the oil from the upper side of piston 13 to the inlet side of pump 18. The pump motor is controlled as to speed by a motor rheostat 21; and the resultant oil pressure under piston 13 may be indicated on a pressure gauge 22 (Fig. 1) which is connected to the pipe 17 as at 22a. I prefer to calibrate the gauge 22 in pounds of tension upon the strip 6 instead of in pounds per square inch.

Mounted on a bracket 23 is a pulley 24, over which a cable 25 passes. The cable is connected to the yoke 11 by a bracket, or the like, 26. The highest position of the connection 26 is shown at $26^1$ and the lowest at 26''. The cable 25 is used to transmit to a rheostat for the succeeding mill of the train, a controlling motion based upon the position of the movable roll 10, to effect the automatic regulation hereinabove referred to.

Figures 4, 5, 6 and 7 disclose means for controlling the mill motor rheostat or the pulling machine rheostat as the case may be. The cable 25, connected as described to the yoke 11, and passing over the pulley 24, is connected to a sprocket chain 27. The links of this chain engage the teeth of a sprocket 28 mounted idly on a shaft 29. The chain 27 may be connected to a weight 30. Extended pins 31 and 31', shown in Figures 4 and 5, are mounted on the chain and are arranged to engage a segment 32 keyed to the shaft 29. Mounted and keyed to shaft 29 is a sprocket 33 which drives the rheostat sprocket 34 through a chain 35. The sprocket 34 idles on the rheostat shaft 36 and can only drive this shaft through hub jaws which engage cooperating jaws of a handwheel 37, which is keyed to shaft 36 and is slidably mounted thereon so that the jaws can be disengaged, making hand regulation of the rheostat possible. Handwheel 37 is disengaged when in the position $37^1$, and can be held in either position by suitable detents (not shown). The jaw or clutch construction is shown at 36a in Figure 6.

The shaft 36 is mounted in the rheostat 38; and bears the usual contactor arm 40, which engages the usual contact buttons 39. The movement of the movable roll 10 in our exemplary device is divided into three ranges, viz., a range of increased speed from point 41 to 42, a range of no speed regulation 42 to 43, and a range of reduced speed 43 to 44 (Fig. 4). When the movable roller enters the increase-speed range at 42, the extended pins 31 engage the segment 32 (as the weight 30 descends), rotating the shaft 29 in a clockwise direction. This motion is transmitted from sprocket 33 through chain 35 to sprocket 34. Thence through the clutch 36a, the motion is transmitted to the handwheel 37, and the shaft 36 which cuts out resistance in the motor circuit increasing the speed of the mill motor or the pulling machine. This in turn operates to pull the movable roller out of the increase speed range 42—43. Should the movable roll 10 descend below 43 into the 43—44 range the action will be the reverse of that described for the acceleration of the mill motor. The extended pins $31^1$ will engage the opposite edge of the segment 32, and the rheostat will be regulated to increase the resistance in the motor circuit. The automatic control of the mill motor or pulling machine rheostat 38 will keep the movable roll 10 within a desired range. Such strip capacity as the movable roll 10 can take up or pay out insures the maintenance of strip tension while the mill motor rheostat 38 is being regulated, and until the motor responds, to regulate the desirable length of strip that is to be maintained between stands.

Thus the function of the mill speed and tension control equipment C is to maintain at all times a predetermined tension in the strip 6 between mills A and B not only by automatically regulating the speed of the mill B, or a pulling machine, as the case may be, but also by taking up and paying out the strip under a predetermined force. The predetermined tension in strip 6 is maintained by the regulation of the oil pressure under piston 13. A rheostat 21 may be provided to control the speed of the pump motor 19.

When the piston 13 is exerting the desired pressure upon the strip 6, the value of the tension is indicated on the gauge 22; and as long as no slack is introduced into the strip 6, the pump 18 will maintain the necessary oil pressure, although slippage will occur in the pump. Should some slack be introduced into strip 6, due to mill slippage or asynchronism, the oil pressure will drop slightly as the upward movement of piston 13 occurs; but this condition will be corrected as soon as the movement of piston 13 is arrested.

The exemplary embodiment of my invention contemplates placing a mill speed and tension controlling device between all the mills of the mill train and/or between each mill and a pulling device, and between the last mill and the pulling machine.

The tension between the various mills will be so adjusted that the tension in the piece will be greater, or less, or the same, on the exit side of each mill with reference to the tension on the entering side. My invention is thus capable of exceedingly flexible operation, which, however, is characterized by a continuous maintenance of the desired maximum tensions and/or tension differences with respect to each pass, which has not been possible hitherto.

Figure 8 discloses another apparatus suitable for the practice of my invention, in which a hydraulic system using variable loaded accumulators 45 is used. I have shown, for each of the control units C, a separate accumulator, whereby the tension on each mill may be individually adjusted. Mills A, B, D and E are arranged in tandem; and after the mill E, a pulling machine F is provided to pull the strip 6 in the direction of arrow 7. The tension between mill E and pulling machine F is, in this instance, greater than the tension between mills D and E; and between each set of mills the tension is reduced so that each mill will be operating under a favorable "effective tension."

The water load accumulator tanks are indicated at 48. The different levels to which water rises in these accumulator tanks is indicated by the water gauges 47. The accumulator tanks may be filled from lines 48 by opening valves 49 from the mill water supply line 50. The tension introduced into the strip is indicated by gauges 22. The accumulator tanks can be drained by valves 51. The accumulators are charged by a hydraulic pump 52 which takes its water from the mill water supply line. For this purpose valves 53 and 54 are opened and valves 55 are closed. After the accumulators are charged, the valves 63 are closed and the pump 52 is stopped. When threading the strip 6 through the mills, the movable rolls 10 can be lowered to position 10'' by closing the valves 54 and opening the valves 55. The pipe 20 will carry away any leakage of water past the piston 13.

Figures 9 and 10 show my pulling machine. This machine is designated by the letter "F" on Figure 8, and comprises two similar housings 56 stayed by separators 56$^1$, carrying bottom pulling rolls 57. These are driven by shafts 58 from a suitable source of power. Idler rolls 59 are carried in an adjustable housing 60, which is moved in a vertical direction by screws 61. The housings 56 also carry driven pinch rolls 62 which are driven by shafts 63, and idler pinch rolls 64 which are carried in vertically adjustable bearings 65. An adjustment of pinch rolls 62 is provided by a screw 66, spring blocks 67 and springs 68. The screws 66 may be operated by handwheels 69 on shafts 70, and by worm gears (not shown) in a worm gear housing 71.

The adjustable housing 60, which carries the rolls 59, is adjusted by screws 61 which are driven by a motor 72 through chains 73 and 74, as shown, driving shafts 75 and worm gears (not shown) in a worm gear housing 76. The adjustable rolls 59 can be raised to a position shown at 59$^1$ by the motor 72, when threading the machine. The pulling rolls 57 and 59 may be provided with cork inserts or other means to increase the friction upon the strip.

The strip 6 is shown passing through the machine in the direction of the arrow 7, leaving the outgoing end of the strip 6 free for shearing or coiling without releasing the tension in the strip 6 on the ingoing side, and permitting the tensioning device to be used upon endless lengths of strip.

The driving shafts 58 and 63 may be connected to a secondary gear drive 76, with various gears to give the proper spacing, speed and direction to shafts 58 and 63. This, in turn, may be driven by a primary drive 77 as shown, connected to a variable speed motor 78. The speed of motor 78 is controlled by the final control unit C.

In my pulling device the material is wrapped around a plurality of rolls indicated at 57 and 59, and then is caught by pinch rolls, which assures sufficient tension on the strip after it leaves the rolls 57 and 59 to provide a tight frictional contact with the strip. It is an advantage of my pulling device that a continuous strip may be handled therein. Upon this strip may be exerted as much tension as desired within the limit of the ultimate strength of the reduced strip.

It will be obvious that I may, if desired, employ means to retard and/or tension the strip as it enters a train of mills, such means preferably taking the form of a brake.

In an exemplary set-up for rolling iron or steel to tin gauges, I may provide seven mills operating continuously upon the same strip or continuous supply and divided into two groups, a first group comprising four mills followed by a pulling device, and a second group comprising the remaining three mills, followed by another pulling device. I have indicated in Fig. 11 such an organization of parts. Here strip metal is uncoiled or decoiled as at D. Adjacent strips are welded together as at W, any surplus material at the weld being removed by a flash cutter indicated at F'. In order to provide for the discontinuous character of the welding operation, and to permit the continuous operation of the mills, the material may be looped as at L. The mills of the train are indicated at M$^1$ and M$^2$, and etc. The various take-up devices are indicated at R$^1$, R$^2$, and etc. A brake so marked may be employed to tension the strip prior to its entry into the first mill M$^1$. Static tension devices R$^1$, etc. are located between each of the mills, on each side of the puller P$^1$, and between the final mill M$^2$ and the puller P$^2$. The general operation of this organization of parts will be clear from the description hereinabove. Beyond the puller P$^2$ the material may be cut apart by a shear, so marked, into sheets, or into lengths suitable for coiling at C$^2$. The shear may be a so-called flying shear.

The tension diagram, Fig. 12, shows several ways of controlling the tensions on the several passes in the installation of Fig. 11; but it will be understood that these several ways are illustrative only of methods of operation. It is a characteristic of my apparatus and of the broad aspects of my process as claimed herein, that the operation is flexible and the tensions and/or tension differences with respect to each pass may not only be controlled to desired maximum values, but may be maintained at said maximum values by the operation of the several parts, irrespective of the natural variations which occur in the rolling of metal. In the tension diagram, Fig. 12, the vertical lines are marked M$^1$, etc. or P$^1$, etc. to indicate the locations of the several mills or pulling devices, respectively, the tension diagrams on these charts indicating exemplary tension changes occurring at or through the actions of these several instrumentalities.

In Fig. 13 I have shown a mill train in which the mills are again indicated at M¹, M², etc., but in which pulling devices P¹, P², etc. are located between each stand of mills and beyond the final mill in the train. The other mechanisms are indicated in Fig. 13 by the same indicia as are employed in Fig. 11.

Fig. 14 is a tension diagram showing several modes of operating the instrumentalities of Fig. 13, but again being exemplary only and not limiting.

Fig. 15 illustrates a type of static tension device which is actuated by gravity. This is advantageous under a number of circumstances, primarily in that the force applied to the tensioning device can be maintained more constantly at the desired value. The device acting upon the strip is the same as to most of its parts, and like parts in Fig. 15 have been indicated by like indicia. In this modification, however, the yoke member 11, in which the upper roll 10 is journaled, is not actuated by a hydraulic cylinder, but instead is drawn upwardly by a cable 79, acted upon by a weight of constant though adjustable magnitude. A framework comprising uprights 90 and a cross head 98 is provided at some convenient point, and a weight indicated at 88 is slidably mounted on brackets 91, so as to move vertically on the standards 90. This weight has been indicated in the form of a tank for containing water, or other fluid, provided with a gauge 92 which may be calibrated, if desired, in pounds of tension on the strip. The liquid level may be raised by adding liquid through the conduit 93, or lowered by draining through the outlet valve 94. In order to provide for sufficient vertical movement of the weight 88, the lower part of the framework may be located in a pit 95, having drainage means 96, if desired. Blocks 97 are located in the bottom of the pit. The weight at its lowermost position rests on these blocks. Where a tank is employed as illustrated, it will preferably be attached to a suspension member indicated at 89, in which is journaled a sheave 82. The cable 79, attached to the yoke 11 of the strip tensioning device, passes over a sheave 80 mounted upon the cross head 8, thence over a sheave 81 above the weight, and downwardly to engage the sheave 82. The cable returns to a position above the cross head 98 to pass over sheaves 83 and 84, whence it passes downwardly to a motor driven reeve indicated at 85. The motor 87 drives this reeve through a gear box 86 having a worm and gear arrangement which is self-locating.

This arrangement is capable of exerting a constant and invariable force upon the yoke member 11. It will be obvious also that the distances of movement of the various parts are scaled down. Since the strip 6 passes over the upper roller 10 in a loop, the vertical movement of the yoke 11 in taking up a given length of strip is half only of the length of strip so taken up. Likewise, since the cable 79 makes a loop over the sheaves 81 and 83 to engage the sheave 82 of the weight, the vertical movement of the weight is but half of the movement of the yoke 11 produced thereby. This, while it necessitates the application of a force of considerable magnitude upon the yoke 11 and necessitates the use of a very heavy weight, yet minimizes the effects of inertia and makes for the steadier application of the constant force.

In operation, when it is desired to thread up the tensioning device, the motor 87 is started so as to pay out cable from the reeve 85. This lowers the weight 88 until it rests upon the blocks 87. A further paying out of the cable 79 will result in a lowering of the yoke 11 to the desired level. When the machine has been threaded with the strip, the motor 87 is started in the opposite direction, taking up the cable 79. This results in the application of force against the strip 6, and when the yoke 11 has been raised to such a point as to take up any slack in the strip, the further taking up of the cable 79 will raise the weight 88. In this way the level of the weight 88 may be adjusted with respect to the level of the yoke 11.

It will be obvious that instead of the single cable 79, a plurality of cables may be used, and it will be equally obvious that instead of a weight in the form of a tank filled with liquid, a container filled with shot, or the like, may be employed, or instead of either of these, a frame or carriage may be journaled on the uprights 90, and may be loaded with removable weights to the desired total weight. Provision is thus made for weight adjustment; but the application of force to the yoke 11 is not dependent upon the transmission of fluid through conduits, or upon the action of a fluid cylinder.

In the specifications and the claims which follow, the word constant as applied to tension or tension value, should be construed as implying that the tension for any given setting of the machine, is not characterized by substantial variations from a predetermined value, and is used in this sense to distinguish from conditions in which the tension sporadically varies by substantial amounts, and also to distinguish from conditions in which the tension while substantially varying, nevertheless has its variations so controlled or compensated for as to have what might be termed an average or mean value of constant character.

It will be obvious that modifications may be made in the particular instrumentalities combined to the ends of my invention, without departing from the spirit thereof.

Having thus described my invention, what I claim as new and desire to secure by Letters Patent is:

1. A process of cold rolling metal, which comprises passing metal in the form of a band continuously through one mill, pulling on said metal beyond said mill, exerting a predetermined static tension on said metal between said mill and the point of application of said pull, passing said metal continuously through a second mill and exerting a predetermined static tension on said metal between the point of application of said pull and said second mill.

2. A process of cold rolling metal, which comprises passing metal in the form of a band continuously through one mill, pulling on said metal beyond said mill, exerting a predetermined static tension on said metal between said mill and the point of application of said pull, passing said metal continuously through a second mill and exerting a predetermined static tension on said metal between the point of application of said pull and said second mill, and exerting a predetermined static tension upon said metal between said second mill and another device exerting tractive effort on said metal.

3. In a rolling mechanism the combination of interspaced driven mills, a pulling device located between said mills, and static tension maintaining devices located between each mill and said pulling device.

4. In a rolling mechanism, the combination of interspaced driven mills, a pulling device located between said mills, static tension maintaining devices located between each mill and said pulling device, a device beyond the second of said mills adapted to exert tractive effort on a piece being rolled, and a static tension maintaining device located between said second mill and said tractive device.

5. In a rolling mechanism, the combination of interspaced driven mills, a pulling device located between said mills, static tension maintaining devices located between each mill and said pulling device, a device beyond the second of said mills adapted to exert tractive effort on a piece being rolled, a static tension maintaining device located between said second mill and said tractive device, and means operative in connection with said tension maintaining devices to control the speeds of said several other instrumentalities.

6. In a rolling apparatus, the combination of a welder, a flash cutter, a looper, a tandem train of cold mills, pulling devices located between each of said mills and beyond the final mill of said train, static tension take-up devices located between each of said mills and each of said pulling devices, means for causing said static tension take-up devices to control the speeds of mills and said pulling devices, a shear located beyond the final pulling device, and a coiler located beyond said shear.

7. In a rolling apparatus, the combination of a welder, a flash cutter, a looper, a brake for holding back a supply of metal to be rolled, a tandem train of cold mills, pulling devices located between each of said mills and beyond the final mill of said train, static tension take-up devices located between each of said mills and each of said pulling devices, means for causing said static tension take-up devices to control the speeds of mills and said pulling devices, a shear located beyond the final pulling device, and a coiler located beyond said shear.

8. That process of cold rolling metal strip, which comprises securing metal strips together to form a continuous supply and rolling the combined supply through a plurality of cold mills forming a train, pulling on said metal as it leaves said train, and maintaining the entering and leaving tensions at each pass to predetermined, constant values continuously, by exerting a predetermined static tension on said metal between each mill and each adjacent device having to do with the movement of the strip, whether said device be a mill or a puller.

9. That process of cold rolling metal strip, which comprises securing metal strips together to form a continuous supply, rolling the combined supply through a plurality of cold mills forming a train, pulling on said metal as it leaves said train, pulling on said metal otherwise than by rolling it, at least at one point intermediate said train, and applying at the entrance and exit sides of at least each mill in the train excepting the first, a predetermined, static tension to said strip, the application of said static tension occurring between each mill and each adjacent device having to do with the movement of the strip, whether said device be a mill or a puller.

10. In a rolling mechanism, the combination of interspaced driven mills, a pulling device located beyond said mills and at least one pulling device located intermediate said mills, static tension maintaining devices located between each mill and each adjacent mill in the direction of rolling and also between each mill and each adjacent puller throughout the train in the direction of rolling, and also between each puller and each adjacent mill throughout the train in the direction of rolling.

EDWIN B. HUDSON.